US010014528B2

(12) United States Patent
Maeda et al.

(10) Patent No.: US 10,014,528 B2
(45) Date of Patent: Jul. 3, 2018

(54) CONDUCTIVE ADHESIVE COMPOSITION FOR ELECTROCHEMICAL ELEMENT ELECTRODE, COLLECTOR WITH ADHESIVE LAYER, AND ELECTROCHEMICAL ELEMENT ELECTRODE

(75) Inventors: Koichiro Maeda, Yokohama (JP); Naoki Yoshida, Tokyo (JP)

(73) Assignee: Zeon Corporation, Tokyo (JP)

( * ) Notice: Subject to any disclaimer, the term of this patent is extended or adjusted under 35 U.S.C. 154(b) by 848 days.

(21) Appl. No.: 14/236,491

(22) PCT Filed: Aug. 3, 2012

(86) PCT No.: PCT/JP2012/069833
§ 371 (c)(1),
(2), (4) Date: Jan. 31, 2014

(87) PCT Pub. No.: WO2013/018887
PCT Pub. Date: Feb. 7, 2013

(65) Prior Publication Data
US 2014/0154569 A1  Jun. 5, 2014

(30) Foreign Application Priority Data
Aug. 3, 2011 (JP) .................... 2011-170386

(51) Int. Cl.
*H01G 11/22* (2013.01)
*H01G 11/66* (2013.01)
*H01M 4/04* (2006.01)
*H01M 4/66* (2006.01)
*H01M 4/133* (2010.01)

(52) U.S. Cl.
CPC ............ *H01M 4/663* (2013.01); *H01G 11/22* (2013.01); *H01G 11/66* (2013.01); *H01M 4/0404* (2013.01); *H01M 4/133* (2013.01); *H01M 4/667* (2013.01); *H01M 4/668* (2013.01); *H01M 4/0471* (2013.01)

(58) Field of Classification Search
CPC ........ H01M 4/663; H01G 11/22; H01G 11/66
See application file for complete search history.

(56) References Cited

U.S. PATENT DOCUMENTS

| 2004/0234850 A1 | 11/2004 | Watarai et al. | |
| 2006/0058462 A1* | 3/2006 | Kim | H01M 4/621 525/166 |
| 2010/0248041 A1* | 9/2010 | Kikuchi | C01B 31/02 429/342 |
| 2012/0315541 A1* | 12/2012 | Sasaki | H01M 4/131 429/211 |

FOREIGN PATENT DOCUMENTS

| CN | 1720628 A | 1/2006 |
| CN | 101911349 A | 12/2010 |
| EP | 1 244 158 A1 | 9/2002 |
| JP | 9-097625 A | 4/1997 |
| JP | 9-213337 A | 8/1997 |
| JP | 2002-304997 A | 10/2002 |
| JP | 2003100298 A * | 4/2003 |
| JP | 2003-173781 A | 6/2003 |
| JP | 2006-513554 A | 4/2006 |
| JP | 2007-231264 A | 9/2007 |
| JP | 2010-129186 A | 6/2010 |
| JP | 2010-177061 A | 8/2010 |
| WO | WO 01/29917 A1 | 4/2001 |
| WO | WO 2011/024789 A1 | 3/2011 |
| WO | WO 2011/122297 * | 10/2011 |

OTHER PUBLICATIONS

WO 2011/122297 translation.*
Translation of JP2003100298.*
Forms PCT/IB/338, PCT/IB/373 and PCT/ISA/237, dated Feb. 13, 2014 for International Application No. PCT/JP2012/069833.
International Search Report issued in PCT/JP2012/069833, dated Sep. 11, 2012.

* cited by examiner

*Primary Examiner* — Ula C Ruddock
*Assistant Examiner* — Gregory Passa
(74) *Attorney, Agent, or Firm* — Birch, Stewart, Kolasch & Birch, LLP

(57) ABSTRACT

To provide a conductive adhesive composition for an electrochemical element electrode and used in forming a conductive adhesive layer that is highly uniform and is interposed between a collector and an electrode composition layer, being able to contribute to increased adhesion between the two. The conductive adhesive composition for an electrochemical element electrode is characterized by containing: conductive carbon; a particulate copolymer (A) containing a dibasic acid monomer unit; a particulate copolymer (B) containing an ethylenically unsaturated carboxylic acid amide derivative unit; and a dispersing agent.

18 Claims, No Drawings

CONDUCTIVE ADHESIVE COMPOSITION FOR ELECTROCHEMICAL ELEMENT ELECTRODE, COLLECTOR WITH ADHESIVE LAYER, AND ELECTROCHEMICAL ELEMENT ELECTRODE

TECHNICAL FIELD

The present invention relates to a conductive adhesive composition for the electrochemical element electrode, and particularly to an adhesive composition suitable for forming the conductive adhesive layer having good uniform adhesiveness on the collector surface of a lithium ion secondary battery. Also, the present invention relates to a collector with the adhesive layer comprising the conductive adhesive layer formed by said adhesive composition, and the electrochemical element electrode formed with the electrode composition including the electrode composition on the conductive adhesive layer of the collector.

BACKGROUND ART

The electrochemical element, particularly the lithium ion battery, which is compact and light, having high energy density, and capable of repeating the charge and discharge has rapidly increased the demand by utilizing its characteristics. Also, the electrochemical element which is represented by the lithium ion secondary battery is expected to be used for a small scale purpose such as for the mobile phone or a laptop computer to a large scale purpose such as for in-vehicle, as it has large output density and energy density. Therefore, for these electrochemical element, along with the increase and development of the use of purpose, further improvements is demanded for lower resistance, higher capacity, high voltage resistance, mechanical characteristic, and cycle lifetime or so.

The electrochemical element increases the operating voltage by using the organic electrolytic solution, thereby the energy density can be increased, however on the other hand, since the viscosity of the electrolytic solution is high, there was a problem that the inner resistance was large.

In order to reduce the inner resistance, it is proposed to provide the conductive adhesive layer in between the electrode composition layer and the collector (Patent document 1). The conductive adhesive agent of the patent document 1 includes the carbon black as the conductive material, and includes the polyvinylidenefluoride resin as the binder.

Patent document 2 teaches to provide, in the electrode for the lithium ion capacitor, the conductive adhesive layer in between the collector and the electrode composition layer in order to improve the electrode strength and to reduce the inner resistance. Also, Patent document 2 describes polyamide or acrylate polymer or so as examples of the binder used for the conductive adhesive agent. Also, it describes that acrylate polymer may include a dibasic acid monomer such as fumaric acid, itaconic acid or so.

PRIOR ART DOCUMENT

Patent document 1: JP Patent Application Laid Open No. 2002-075805
Patent document 2: WO2010/024327

SUMMARY OF THE INVENTION

Technical Problems to be Solved by the Invention

However, according to the examination by the present inventors, the conductive adhesive agent of the patent document 1 was insufficient in regards with the reduction of the inner resistance of the electrode.

Also, as for the lithium ion capacitor electrode of the patent document 2, the metal film having a through hole such as the expand aluminum or so is used as the collector. In case of such the porous collector, even if the conductive adhesive layer mentioned in the above is formed, the adhesive agent is unlikely to be repelled by the collector, hence the conductive adhesive layer having uniform and good adhesiveness can be formed.

However, on the contrary to the lithium ion capacitor, in many cases, the lithium ion secondary battery uses the foil form metal which does not have the through hole as the collector. If the usual conductive adhesive agent is coated to such foil form a metal collector, the adhesive agent is repelled by metal foil surface; the pin hole may be formed to the adhesive layer, or the uniformity of the adhesive layer or the adhesiveness against the collector were compromised. As a result, the uniformity of the electrode composition layer formed on the adhesive layer was lowered, and the adhesiveness between the electrode composition layer and the adhesive layer became insufficient, thus the lifetime or the electrode strength of the battery may be compromised.

Therefore, the object of the present invention is to provide the conductive adhesive composition for the electrochemical element electrode used for the forming of the conductive layer having high uniformity which can contribute to improve the adhesiveness between the collector and the electrode composition layer by placing it therebetween.

MODES FOR CARRYING OUT THE INVENTION

The present inventors have carried out a keen examination to solve the above mentioned object, thereby found that by using specific two types of the particulate copolymer together as the binder of the conductive adhesive layer provided between the collector and the electrode composition layer, the coating of the conductive adhesive agent becomes smooth, and the uniform conductive adhesive layer with a high strength is formed, while the adhesiveness between the collector and the electrode composition layer is improved by having the conductive adhesive layer in between, thereby the secondary battery having high electrode strength or the durability can be obtained.

That is, the gist of the present invention which object is to solve the above mentioned problems is as follows.

(1) A conductive adhesive composition for electrochemical element electrode comprising a conductive carbon, a particulate copolymer (A) including dibasic acid monomer unit, a particulate copolymer (B) including ethylenic unsaturated carboxylic acid amide derivative unit, and a dispersing medium.

(2) The conductive adhesive composition for the electrochemical element electrode as set forth in (1), wherein said particulate copolymer (A) is;

a particulate copolymer (A-I) obtained by an emulsion polymerization of a monomer mixture including 60 to 90 wt % of ethylenic unsaturated carboxylic acid ester, 0.1 to 5 wt % of dibasic acid monomer, and 39.9 to 5 wt % of monoolefinic monomer copolymerizable therewith; and/or, a particulate copolymer (A-II) obtained by emulsion polymerization of a monomer mixture including 20 to 50 wt % of diene based monomer, 0.1 to 5 wt % of dibasic acid monomer, and 79.9 to 50 wt % of monoolefinic monomer copolymerizable therewith.

(3) The conductive adhesive composition for the electrochemical element electrode as set forth in (1) or (2), wherein said particulate copolymer (B) is a particulate copolymer obtained by an emulsion polymerization of a monomer mixture including 1 to 5 wt % of ethylenic unsaturated carboxylic acid monomer, 0.1 to 3 wt % of ethylenic unsaturated carboxylic acid amide derivative, and 35 to 90 wt % of monoolefinic monomer copolymerizable therewith.

(4) The conductive adhesive composition for the electrochemical element electrode as set forth in any one of (1) to (3), wherein a content ratio of the conductive carbon is 8 to 38 wt %, the content ratio of the particulate copolymer (A) is 1 to 4 wt %, the content ratio of the particulate copolymer (B) is 0.1 to 1 wt %, and the content ratio of the dispersing medium is 60 to 90 wt %.

(5) The conductive adhesive composition for the electrochemical element electrode as set forth in any one of (1) to (4) comprising 0.01 to 1.0 wt % of isothiazoline based compound with respect to the conductive carbon.

(6) The conductive adhesive composition for the electrochemical element electrode as set forth in any one of (1) to (5), wherein an volume average particle diameter of said particulate copolymer (A) is 200 to 500 nm.

(7) The conductive adhesive composition for the electrochemical element electrode as set forth in any one of (1) to (6) wherein a volume average particle diameter of said particulate copolymer (B) is 80 to 250 nm.

(8) A collector with an adhesive layer comprising a conductive adhesive layer obtained by coating and drying the conductive adhesive composition for the electrochemical element electrode as set forth in any one of (1) to (7) on a collector.

(9) A collector having an adhesive layer comprising a conductive adhesive layer comprising a conductive carbon, a particulate copolymer (A) including dibasic acid monomer unit, and a particulate copolymer (B) including ethylenic unsaturated carboxylic acid amide derivative monomer unit, on the collector.

(10) The collector having the adhesive layer as set forth in (8) or (9) wherein a thickness of said conductive adhesive layer is 0.5 to 5 μm.

(11) An electrochemical element electrode comprising an electrode composition layer including an electrode active material on the conductive adhesive layer of the collector having the adhesive layer as set forth in any one of (8) to (10).

Effect of the Present Invention

By using the particulate copolymer (A) including dibasic acid monomer unit and the particulate copolymer (B) including the ethylenic unsaturated carboxylic amide derivative unit together as the binder of the conductive adhesive provided between the collector and the electrode composition layer; the coating of the conductive adhesive agent becomes smooth, and the conductive adhesive layer which is uniform and has high strength can be formed, while the adhesiveness between the collector and the electrode composition layer via the conductive adhesive layer can be improved, thus the secondary battery having high durability and the electrode strength can be obtained.

The system of how such effect is exhibited is not necessarily clear. Although it is not to be limited in any way, the present inventors speculate that the above mentioned effect is exhibited due to the following system. That is, the particulate copolymer (A) includes dibasic acid monomer unit, thus the affinity with the conductive carbon included in the conductive adhesive composition is high, and thereby the dispersibility of the conductive carbon in the conductive adhesive composition is made uniform. After the coating and the drying of the conductive adhesive composition, the adhesiveness between the conductive carbons are improved, hence contributes to the strength of the conductive adhesive layer and the smoothing of the surface condition. However, the binder consisting of particulate copolymer (A) is easily repelled at the collector surface, and the uniformity of the conductive adhesive layer is compromised thus the adhesiveness to the collector becomes insufficient.

On the other hand, the particulate copolymer (B) comprises the amide group, hence it has high wettability against the collector, and contributes to improve the adhesiveness. Therefore, the adhesive agent including the particulate copolymer (B) can be uniformly coated on the collector surface. However, the adhesive force becomes insufficient if the particulate copolymer (B) is used alone, thus the electrode strength may be lowered.

Further, by using the particulate copolymer (A) and the particulate copolymer (B) together; due to the effect of the particulate copolymer (A), the coating property of the adhesive composition and the coated film strength are improved, and also due to the effect of the particulate copolymer (B), the collector and the conductive adhesive layer are adhered strongly. As a result, the collector and the electrode composition layer are adhered strongly via the smooth conductive adhesive layer having high strength.

As such, by using two types of the particulate copolymers, the coating of the conductive adhesives agent becomes smooth, and the conductive adhesive layer becomes uniform and strong. Also, since it includes the amide group having high adhesiveness against the collector, the adhesiveness between the adhesive layer and the collector is high, and the collector and the electrode composition layer are adhered strongly via the adhesive layer, further particularly the secondary battery having high durability and the electrode strength can be obtained.

THE MODE TO CARRY OUT THE INVENTION

Hereinafter, the present invention will be described including the best mode thereof.

The conductive adhesive composition for the electrochemical element electrode according to the present invention includes the conductive carbon, the particulate copolymer (A) including dibasic monomer unit, the particulate copolymer (B) including the ethylenic unsaturated carboxylic amide derivative unit, and the dispersing medium, further other components may be included depending on the needs. Hereinafter, each component will be described.

(The Conductive Carbon)

The conductive carbon used in the conductive adhesive composition for the electrochemical element electrode (hereinafter, it may be simply referred as "the adhesive composition") according to the present invention is not particularly limited with its embodiment, however usually it is a carbon particle. The carbon particle may be consisting of carbon only, or it may be a particle substantially consisting of carbons. As for the specific examples, graphite (specifically, natural graphite or synthesized graphite) having high conductivity due to the presence of delocalized π electron, carbon black (specifically, acetylene black, ketjen black, other furnace black, channel black, thermal lamp black or so) which is a spherical aggregate formed with a turbostratic structure having several layers of the carbon fine crystals of the graphite coming together, the carbon fiber or the carbon wisker or so may be mentioned. Among these, graphite and carbon black are particularly preferable, since the carbon particle can be filled in a high density and can reduce the electron transfer resistance of the conductive adhesive layer, further the inner resistance of the lithium ion battery can be reduced. These conductive carbons may be used alone, or by combining two or more thereof.

The electric resistivity of the conductive carbon is preferably 0.0001 to 1 Ω·cm; more preferably 0.0005 to 0.5 Ω·cm; particularly preferably 0.001 to 0.1 Ω·cm. When the electric resistivity of the conductive carbon is within this range, the electron transfer resistance of the conductive adhesive layer is further reduced, and the inner resistance of the lithium ion battery can be further reduced. Here, the resistance value is measured using the powder resistance measuring system (MCP-PD51 made by Mitsubishi Chemical Analytech Co., Ltd.) while applying a pressure to the carbon particle, and the electric resistivity ρ (Ω·cm)=R×(S/d) is calculated from the resistance value R (Ω) converged with respect to the pressure, and the area S ($cm^2$) and the thickness d (cm) of the compressed carbon particle layer.

The volume average particle diameter of the conductive carbon is preferably 0.01 to 20 μm, further preferably 0.05 to 15 μm, and particularly preferably 0.1 to 10 μm. When the volume average particle diameter of the conductive carbon is within this range, the conductive carbon of the conductive adhesive layer is filled in a high density, thus the electron transfer resistance is further reduced, and the inner resistance of the lithium ion battery is further reduced. Here, the volume average particle diameter is value calculated and measured by Laser Diffraction Particle Size Analyzer (SALD-3100 made by Simazu Corporation).

(The Particulate Copolymer (A))

The particulate copolymer (A) includes the dibasic acid monomer unit. Here, the dibasic acid monomer unit is a dibasic acid and has repeating unit derived from the compound having the polymerizability. The particle shape may be a spherical shape, or it may be an oval shape, or it may be other deformed shape; however the shape preferably has high spheroidicity.

As for the dibasic acid monomer unit, for example ethylenic unsaturated polyvalent carboxylic acid such as itaconic acid, maleic acid, fumaric acid, maleic anhydride, citraconic anhydride or so and the anhydrides thereof; partial ester compound of the ethylenic unsaturated polyvalent carboxylic acid such as monobutyl fumarate, monobutyl maleate, mono2-hydroxypropyl maleate or so may be mentioned. Among these, itaconic acid is particularly preferable since the polymerization is relatively easy. The dibasic acid monomer unit may be used alone or by combining two or more thereof.

The particulate copolymer (A) is not particularly limited as long as the dibasic acid monomer unit is included. However, from the point of attaining suitable binding property, dispersibility, and particle property, the particulate copolymer (A) is preferably a particulate copolymer (A-I) obtained by emulsion polymerizing the monomer mixture including ethylenic unsaturated carboxylic acid ester and the monoolefinic monomer copolymerizable therewith in addition to the dibasic acid monomer unit, and/or a particulate copolymer (A-II) obtained by emulsion polymerizing the monomer mixture including diene based monomer and monoolefinic monomer copolymerizable therewith in addition to the dibasic acid monomer unit.

As for the specific examples of the ethylenic unsaturated carboxylic acid ester, acrylates such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, hexyl acrylate, nonyl acrylate, lauryl acrylate, stearyl acrylate or so; methacrylates such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate or so may be mentioned. Among these, acrylates are preferable, and n-butyl acrylate and 2-ethylhexyl acrylate are particularly preferable as these can improve the strength of the obtained electrode. These ethylenic unsaturated carboxylic acid ester can be used alone, or by mixing two or more thereof.

As the specific examples of the diene based monomer, 1,3-butadiene, isoprene, 2-chloro-1,3-butadiene, chloroprene, pentadiene or so may be mentioned. Among these, 1,3-butadiene and isoprene are preferable, and 1,3-butadiene is particularly preferable from the point of improving the lifetime of the obtained battery. These diene based monomers may be used alone, or by mixing two or more thereof.

As each of the above mentioned monomers and copolymerizable monoolefinic monomer, for example, ethylenic unsaturated nitrile monomer, aromatic vinyl monomer, ethylenic unsaturated monocarboxylic acid monomer or so may be mentioned.

As for ethylenic unsaturated nitrile monomer, for example, acrylonitrile, methacrylonitrile, fumaronitrile, α-chloroacrylonitrile or so may be mentioned. Among these, acrylonitrile is preferable.

As for the aromatic vinyl nitrile, for example styrene, α-methyl styrene, monochloro styrene, vinyl toluene or so may mentioned. Among these, styrene is particularly preferable.

As ethylenic unsaturated monocarboxylic acid monomer unit, for example, ethylenic unsaturated monocarboxylic acid such as acrylic acid or methacrylic acid or so may be mentioned. Also, these ethylenic unsaturated carboxylic acid monomer may be used as a salt such as sodium salt, potassium salt, ammonium salt or so.

As the specific example of other monomer compounds which can be blended, vinyl ester carboxylic acid such as vinyl propionate or so may be mentioned.

These monoolefinic monomer may be used alone or by combining two or more thereof.

Note that, in the particulate copolymer (A), the constitution unit derived from the ethylenic unsaturated carboxylic acid amide derivative which is the essential constitution element of the particulate copolymer (B) described in below is not included; and the content of the constitution unit derived from the ethylenic unsaturated carboxylic amide derivative is less than 0.1 wt %.

The composition of the monomer mixture for forming the particulate copolymer (A-I) is not particularly limited, however as suitable examples, the dibasic acid monomer is 0.1 to 5 wt %, preferably 0.5 to 4.5 wt %, and further preferably 1 to 4.0 wt %; ethylenic unsaturated carboxylic acid ester is 60 to 90 wt %, preferably 65 to 85 wt %, and more preferably 68 to 82 wt %; and monoolefinic monomer is 39.9 to 5 wt %, preferably 35 to 10 wt %, and more preferably 30 to 15 wt %.

The composition of the monomer mixture for forming the particulate copolymer (A-II) is not particularly limited, however as a suitable example, the dibasic monomer is 0.1 to 5 wt %, preferably 0.5 to 4.5 wt %, more preferably 1 to 4.0 wt %; the diene based monomer is 20 to 50 wt %, preferably 25 to 45 wt %, and more preferably 30 to 40 wt %; and monoolefinic monomer is 79.9 to 50 wt %, preferably 75 to 52 wt %, and more preferably 70 to 55 wt %.

The glass transition temperature of such particulate copolymer (A) is preferably −40 to 40° C.

Tetrahydrofuran insoluble part of the particulate copolymer (A) is preferably 60 to 99 wt %, more preferably 70 to 95 wt %. When the tetrahydrofuran insoluble part is within said range, the electrode having the active material layer with high release strength can be obtained.

As for the particulate copolymer (A), the dibasic acid structure is included; thus it has high affinity against the conductive carbon. Therefore, in the conductive adhesive composition, the dispersibility of the conductive carbon improves, and the conductive carbon in the composition disperses uniformly. Further, the coating property of the conductive adhesive composition improves, and the surface condition of the obtained conductive adhesive composition improves, thus the adhesive layer surface becomes smooth. Also, after the drying of the composition, the conductive carbons are adhered against each other strongly, and contribute to the strength of the conductive adhesive layer.

(The Particulate Copolymer (B))

The particulate copolymer (A) includes ethylenic unsaturated carboxylic acid amide derivative unit. Here, ethylenic unsaturated carboxylic acid amide derivative unit includes the precursor structure which can derive the carboxylic acid amide, the derivative thereof or the carboxylic acid amide structure in the molecule, and is a repeating unit which is derived from the polymerizable compound having ethylenic unsaturated bond. The particle shape may be a spherical shape, or an oval shape, or it may also be other deformed shape, however it is preferably the shape having high spheroidicity.

As for the ethylenic unsaturated carboxylic acid amide monomer, for example N-(hydroxyalkyl) substituted ethylenic unsaturated carboxylic acid amide such as N-methylol (meth)acryl amide, N-ethylol(meth)acryl amide, N-butylol (meth)acryl amide or so; (meth)acryl amide, methyl(meth) acryl amide, ethyl(meth)acryl amide, diethyl(meth)acryl amide, dimethyl(meth)acryl amide, isopropyl(meth)acryl amide, butyl(meth)acryl amide, hydroxyethyl(meth) acryl amide, acryloyl morpholine or so may be mentioned.

Among these, N-(hydroxyalkyl) substituted ethylenic unsaturated carboxylic acid amide is preferable, and N-methylolacrylamide is particularly preferable. These ethylenic unsaturated carboxylic acid amide derivative may be used alone or by combining two or more thereof.

The particulate copolymer (B) is not particularly limited, as long as ethylenic unsaturated carboxylic acid amide derivative unit is included, however from the point of attaining suitable binding property, dispersibility, particle shape, the particulate copolymer is preferably obtained by emulsion polymerizing the monomer mixture including ethylenic unsaturated carboxylic acid and monoolefinic monomer copolymerizable therewith in addition to ethylenic unsaturated carboxylic acid amide.

As for ethylenic unsaturated carboxylic monomer, as similar to those described in said particulate copolymer (A), ethylenic unsaturated monocarboxylic acid such as acrylic acid, methacrylic acid or so may be mentioned. Also, these ethylenic unsaturated carboxylic acid monomer may be used in a condition of salt such as sodium salt, potassium salt, ammonium salt or so. Further, carboxylic acid vinyl ester such as vinyl propionate or so may be blended.

As for each monomer mentioned in above, and copolymerizable monoolefinic monomer, for example ethylenic unsaturated nitrile monomer, aromatic vinyl monomer, ethylenic unsaturated carboxylic ester monomer or so may be mentioned. Among these specific examples of the monomers, the same monomers described in said particulate copolymer (A) may be mentioned.

Note that, in the particulate copolymer (B), the constitutional unit derived from the dibasic acid monomer which is the essential constitutional element of aforementioned particulate copolymer (A) is not substantially included, and the content of the constitutional unit derived from the dibasic acid monomer is less than 0.1 wt %.

The composition of the monomer mixture for forming the particulate copolymer (B) is not particularly limited; however an example of suitable composition is ethylenic unsaturated carboxylic acid amide derivative of 0.1 to 3 wt %, preferably 0.2 to 2.5 wt %, more preferably 0.5 to 2.0 wt %; ethylenic unsaturated carboxylic acid of 1 to 5 wt %, preferably 1.2 to 4.5 wt %, and more preferably 1.5 to 4 wt %; and monoolefinic monomer of 35 to 90 wt %, preferably 40 to 85 wt %, and 50 to 80 wt %.

The glass transition temperature of such particulate copolymer (B) is preferably −40 to 40° C.

The tetrahydrofuran insoluble part of the particulate copolymer (B) is preferably 0 to 25 wt %, and more preferably 0 to 20 wt %. When the tetrahydrofuran insoluble part is within the above mentioned range, it becomes easy to spread to the surface of the collector, and the release strength easily improves.

In the particulate copolymer (B), since the carboxylic acid amide structure is included, the affinity against the metal such as the collector is high. Therefore, the wettability of the conductive adhesive composition against the collector is high, hence the composition can be uniformly coated to the collector surface, and the pinhole is suppressed from forming, thereby the conductive adhesive layer having good surface condition can be formed. Therefore, the electrode composition layer formed on the adhesive layer becomes smooth. Also, after the coating and drying of the composition, it adheres to the collector due to the carboxylic acid amide structure included in the adhesive layer, thus the electrode strength improves.

In the present invention, as the binder for forming the conductive adhesive layer, by using the particulate copolymer (A) including the dibasic acid monomer unit and the particulate copolymer (B) including the ethylenic unsaturated carboxylic acid amide derivative unit together, the above mentioned special effect can be attained. On the other hand, in case the particulate copolymer which includes both the dibasic acid monomer unit and the ethylenic unsaturated carboxylic acid amide derivative unit in same copolymer is used, said effect is significantly compromised.

(The Particle Diameter of the Particulate Copolymer)

The volume average particle diameter of the particulate copolymer (A) is preferably 200 to 500 nm, more preferably 300 to 500 nm, further preferably 330 to 450 nm, and particularly preferably 350 to 430 nm. Also, the volume average particle diameter of the particulate copolymer (B) is preferably 80 to 250 nm, more preferably 85 to 200 nm, and particularly preferably 90 to 180 nm. Here, the volume average particle diameter is obtained by calculating and measuring using the particle size analyzer (LS230: made by Beckman Coulter Inc).

When the coating and the drying of the composition of liquid including the fine particles are carried out, the fine particles having smaller diameter tends to move to the coted film during the drying, and move to the coated film surface side, thereby it tends to generate concentration difference of the fine particles with smaller particle diameter. On the other hand, the fine particle with relatively large diameter is less likely to move, hence the concentration difference is small within the coated film.

When the volume average particle diameter of the particulate copolymer (A) and (B) are within said range, the movement of the particulate copolymer (A) is regulated compared to the particulate copolymer (B). Since the movement of the particulate copolymer (A) having high affinity with the conductive carbon is relatively limited, the particulate copolymer (A) and the conductive carbon has less movement, and the condition of being uniformly dispersed in the coated film is maintained.

The volume average particle diameter of the particulate copolymer (A) and (B) are limited by accordingly setting the production condition described in below. For example, when the used amount of surfactant for the emulsion polymerization becomes larger, the particle diameter of the obtained particle tends to be smaller.

(The Production of the Particulate Copolymer)

The production method of the particulate copolymer (A) and (B) are not particularly limited, however as mentioned in the above, it can be obtained by emulsion polymerizing each of the monomer mixtures including the monomer constituting each copolymers. As for the method of the emulsion polymerization, it is not particularly limited, and the conventionally known emulsion polymerization may be employed.

As for the polymerization initiator used for the emulsion polymerization, for example, the inorganic peroxides such as sodium persulfate, potassium persulfate, ammonium persulfate, potassium perphosphate, hydrogen peroxide or so; the organic peroxides such as t-butylperoxide, cumene hydroperoxide, p-menthane hydroperoxide, di-t-butyl peroxide, t-butylcumyl peroxide, acetyl peroxide, isobutyryl peroxide, octanoyl peroxide, benzoyl peroxide, 3,5,5-trimethylhexanoyl peroxide, t-butylperoxy isobutylate or so; azo compounds such as azobisisobutylonitrile, azobis-2,4-dimethylvaleronitrile, azobis cyclohexanecarbonitrile, methyl azobislactate or so may be mentioned.

Among these, the inorganic peroxides are preferably used. These polymerization initiators can be used alone or by combining two or more thereof. Also, the peroxide initiators can be combined with the reducing agent such as sodium bisulfate or so and used as redox based polymerization initiator.

The used amount of the polymerization initiator is preferably 0.05 to 5 parts by weight, more preferably 0.1 to 2 parts by weight with respect to the entire amount of 100 parts by weight of monomer mixtures used for the polymerization.

In order to control the tetrahydrofuran insoluble part amount of the obtained copolymer, the chain transfer agent is preferably used during the emulsion polymerization. As the chain transfer agent, for example alkyl mercaptan such as n-hexylmercaptan, n-octylmercaptan, t-octylmercaptan, n-dodecylmercaptan, t-dodecylmercaptan, n-stearylmercaptan or so; xanthogen compounds such as dimethyl xanthogendisulfide, diisopropyl xanthogendisilfide or so; thiuram based compounds such as terpinolen, tetramethylthiuramdisulfide, tetraethylthiuramdisulfide, tetramethylthiurammonosulfide or so; phenol based compounds such as 2,6-di-t-butyl-4-methylphenol, styrene phenol or so; allyl compounds such as allyl alcohol or so; halogenated hydrocarbons such as dichlormethane, dibromomethane, carbon tetrabromide or so; thioglycolic acid, thiomalic acid, 2-ethylhexylthioglycolate, diphenylethylene, α-methylstyrene dimmer or so may be mentioned.

Among these, alkylmercaptan is preferable, and t-dodecylmercaptan is more preferably used. These chain transfer agent may be used alone or by combining two or more thereof.

The used amount of the chain transfer agent is preferably 0.05 to 2 parts by weight, and more preferably 0.1 to 1 parts by weight with respect to 100 parts by weight of the monomer mixture.

During the emulsion polymerization, it is further preferable to use the anionic surfactant. By using the anionic surfactant, the polymerization stability can be improved.

As for the anionic surfactant, those conventionally known can be used during the emulsion polymerization. As specific examples of the anionic surfactant, a higher alcohol sulfuric acid ester salts such as sodium laurylsulfate, ammonium laurylsulfate, sodium dodecylsulfate, ammonium dodecylsulfate, sodium octylsulfate, sodium decylsulfate, sodium tetradecylsulfate, sodium hexadecylsulfate, sodium octadecylsulfate or so; alkyl benzene sulfuric acid salt such as sodium dodecyl benzene sulfate, sodium lauryl benzene sulfate, sodium hexadecyl benzene sulfate or so; fatty group sulfuric acid salt such as sodium lauryl sulfate, sodium dodecyl sulfate, sodium tetradecyl sulfate or so may be mentioned.

The used amount of the anionic surfactant is preferably 0.1 to 10 parts by weight, more preferably 1 to 5 parts by weight with respect to 100 parts by weight of the monomer mixtures. If this used amount is too little, the particle diameter of the obtained particle becomes large, and if the used amount is too much, the particle diameter tends becomes smaller. Also, in addition to the anionic surfactant, non-ionic surfactant, cationic surfactant, amphoteric surfactant or so can be used together.

Further, when carrying out the emulsion polymerization, pH modifier such as sodium hydroxide, ammonium or so; various additives such as a dispersant, a chelating agent, an oxygen scavenging agent, a builder, a seed latex for particle size regulation or so can be suitably used. Particularly, the emulsion polymerization using the seed latex is preferable. The seed latex refers to the dispersion liquid of the fine particle which is the core of the reaction during the emulsion polymerization. The fine particles have the particle diameter of 100 nm or less in many cases. The fine particles are not particularly limited, and the polymer of widely used such as acrylic polymer or so is used. According to the seed polymerization, the particulate copolymer having a relatively uniform particle size can be obtained.

The polymerization temperature during the polymerization reaction is not particularly limited, and usually it is 0 to 100° C., preferably 40 to 80° C. The emulsion polymerization is carried out in such temperature range at the specific polymerization conversion rate, and by adding the polymerization terminator, or by cooling the polymerization or so, the polymerization reaction is terminated. The polymerization conversion rate which terminates the polymerization reaction is preferably 93 wt % or more, and more preferably 95 wt % or more.

After terminating the polymerization reaction, if desired, the unreacted monomer is removed, and the pH or the solid portion concentration is controlled, hence the particulate copolymer is obtained while being dispersed in the dispersing medium (latex). Then, if needed, the dispersing medium may be substituted, and also the dispersing medium is evaporated, then the particulate copolymer may be obtained in a powder form.

In the dispersion liquid of the obtained particulate copolymer, a dispersant, a thickening agent, an antioxidant, a defoaming agent, a preservative, a antimicrobial agent, a blister preventing agent, a pH modifier or so which are known may be added depending on the needs.

(The Dispersing Medium and Other Components)

The conductive adhesive composition for the electrochemical element electrode according to the present invention is a composition in a slurry form wherein the above mentioned conductive carbon, the particulate copolymer (A), and the particulate copolymer (B) are dispersed in the dispersing medium. Here, as the dispersing medium, water and various organic solvent can be used without any particular limitation, as long as above mentioned each component can be dispersed uniformly and that the dispersed condition can be maintained stably. From the point of simplifying the production steps, it is preferable to produce the adhesive composition directly without carrying out the procedure of solvent substitution after the above mentioned emulsion polymerization, and it is desirable to use the reaction solvent of the emulsion polymerization as the dispersing medium. The water is used as the reaction medium in many cases during the emulsion polymerization, and from the point of the working environment, it is particularly preferable to use the water as the dispersing medium.

Further, at the conductive adhesive composition for the electrochemical element electrode of the present invention, the dispersant may be included in order to disperse the above mentioned components.

As the specific example of the dispersant, cellulose based polymer such as carboxymethyl cellulose, methyl cellulose, ethyl cellulose, and hydroxypropyl cellulose or so, and the ammonium salts and the alkaline metal salts thereof; poly(meth)acrylic acid salt such as sodium poly(meth)acrylate, polyvinyl alcohol, modified polyvinyl alcohol, polyethyleneoxide-1-polyvinylpyrrolidone, polycarboxylic acid, oxidized starch, starch phosphate, casein, various modified starch or so may be mentioned. These dispersant may be used lone or by combining two or more thereof.

(The Conductive Adhesive Composition)

The content ratio of each component in the conductive adhesive composition for the electrochemical element electrode according to the present invention is not particularly limited, however from the point of dispersibility and the coating property of each component, the content ratio of the conductive carbon is preferably 8 to 38 wt %, more preferably 10 to 35 wt %, particularly preferably 15 to 30 wt %; the content ratio of the particulate copolymer (A) is preferably 0.1 to 10 wt %, more preferably 0.5 to 9 wt %, particularly preferably 1 to 8 wt %; and the content ratio of the particulate copolymer (B) is preferably 0.1 to 5 wt %, more preferably 0.2 to 4 wt %, particularly preferably 0.3 to 3 wt %. Rest of the part is the dispersing medium and the various components which are added depending on the needs. The content ratio of the dispersing medium is preferably 60 to 90 wt %, more preferably 65 to 85 wt %, and particularly preferably 68 to 85 wt %.

The total content of the particulate copolymer (A) and (B) used as the binder is preferably 0.5 to 20 parts by weight, more preferably 1 to 19 parts by weight, and particularly preferably 2 to 18 parts by weight with respect to 100 parts by weight of the conductive carbon. When the amount of the binder is within this range, the adhesive layer with good conductivity can be obtained.

The ratio of the particulate copolymer (A) and (B) is not particularly limited, however the weight ratio of the copolymer (A)/the copolymer (B) is within the range of preferably 50 to 1, more preferably 25 to 3. When the copolymer (A)/the copolymer (B) is within the above mentioned range, the collector having the adhesive layer wherein the conductive adhesive layer having high strength and uniformity is strongly adhered to the collector can be obtained.

The particulate copolymers (A) and (B) has the glass transition temperatures which are specific to each. In the present invention, the used amount of the particulate copolymers (A) and (B) are preferably selected so that the glass transition temperature of the entire binder becomes preferably −40 to 40° C., and more preferably −40 to 0° C. When the glass transition temperature (Tg) of the binder is within this range, the binding property is excellent even in a small used amount, has strong electrode releasing strength, has good flexibility, and the electrode density can be easily enhanced by press step during the electrode forming.

Further, in the conductive adhesive composition, the binder other than the above mentioned, the thickener, the antioxidant, the defoaming agent, the antimicrobial agent, the pH modifier or so may be added depending on the needs.

Also, the conductive adhesive composition of the present invention preferably includes the preservatives.

As the specific examples of the preservatives, isothiazoline compound or halogenated aliphatic nitroalcohol or so may be mentioned; however in the present invention, isothiazoline compound is preferable.

Note that, in the present invention, in a range which does not interfere the effect of the present invention, the preservative other than the above mentioned can be used, and further the preservative may be used alone or by combining two or more thereof.

The conductive adhesive composition of the present invention comprises the specific amount of isothiazoline based compound, hence the microbes are suppressed from growing, thus the odor is prevented from generating, or the thickening of the conductive adhesive composition can be prevented, hence the long term storage stability is excellent.

The isothiazoline based compound is a known compound as the general preservative, and it is shown by the following structural formula (1).

(Chemical formula 1)

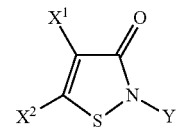

(1)

(in the formula, Y is a hydrogen or the hydrocarbons which can be substituted, $X^1$ and $X^2$ is hydrogen, halogen atom, or the alkyl group having the carbon atoms of 1 to 6 each respectively. Note that $X^1$ and $X^2$ may form the aromatic ring together. Note that $X^1$ and $X^2$ may be the same or different from each other)

First, isothiazoline based compound shown by the above mentioned structural formula (1) will be described.

In the above mentioned structural formula (1), Y is hydrogen or the hydrocarbon group which can be substituted. As for the substituent group of the hydrocarbon group which can be substituted shown by Y, for example hydroxyl group, halogen atom (for example, chlorine, fluorine, bromine, iodine or so), cyano group, amino group, carboxyl group, alkoxy group having the carbon atoms of 1 to 4 (for example methoxy group, ethoxy group or so), aryl oxy group having the carbon atoms of 6 to 10 (for example phenoxy group or so), alkylthio group having the carbon atoms of 1 to 4 (for example methylthio group, ethylthio group or so), and arylthio group having the carbon atoms of 6 to 10 (for example, phenyl thio group or so) or so may be mentioned. Among said substituent group, halogen atom and alkoxy group having the carbon atoms of 1 to 4 are preferable. These substituent groups may substitute the hydrogen of said hydrocarbon group within the range of 1 to 5, preferably of 1 to 3; and said substituent group may be the same or different.

As for the hydrocarbon group shown by Y which can be substituted, for example the alkyl group having the carbon atoms of 1 to 10, the alkenyl group having the carbon atoms of 2 to 6, the alkynyl group having the carbon atoms of 2 to 6, the cycloalkyl group having the carbon atoms of 3 to 10, aryl group having the carbon atoms of 6 to 14 or so may be mentioned. Among these hydrocarbon groups, alkyl group having the carbon atoms of 1 to 10, or the cycloalkyl group having the carbon atoms of 3 to 10 are preferable, and alkyl group having the carbon atoms of 1 to 10 is more preferable.

As for said alkyl group having the carbon atoms of 1 to 10, for example methyl group, ethyl group, propyl group, isopropyl group, butyl group, isobutyl group, sec-butyl group, tert-butyl group, pentyl group, hexyl group, heptyl group, octyl group, isooctyl group, sec-octyl group, tert-octyl group, nonyl group, and decyl group or so may be mentioned. Among these alkyl group, for example the alkyl group having the carbon atoms of 1 to 3 such as methyl group, ethyl group or so, the alkyl group having the carbon atoms of 7 to 10 such as octyl group, tert-octyl group or so are more preferable, and the alkyl group having the carbon atoms of 1 to 3 is more preferable.

As for the alkenyl group having carbon atoms of 2 to 6, for example vinyl group, allyl group, isopropenyl group, 1-propenyl group, 2-propenyl group, 2-methyl-1-propenyl group or so may be mentioned. Among these alkenyl group, vinyl group, allyl group or so are preferable.

As for the alkynyl group having the carbon atoms of 2 to 6, for example ethynyl group, 1-propeynyl group, 2-propynyl group, butynyl group, pentynyl group or so may be mentioned. Among these, alkynyl group, ethynyl group, propynyl group are preferable.

As for the cycloalkyl group having the carbon atoms of 3 to 10, for example cyclopropyl group, cyclobutyl group, cyclopentyl group, cyclohexyl group, cycloheptyl group, cyclooctyl group or so may be mentioned. Among said cycloalkyl group, cyclopentyl group, cyclohexyl group or so are preferable.

As for the aryl group having the carbon atoms of 6 to 14, for example phenyl group, naphthyl group, anthryl group, phenanthryl group or so may be mentioned. Among said aryl group, phenyl group is preferable.

As described in the above, various compounds as the hydrocarbon groups which may be substituted shown by Y were described; however among these, methyl group or octyl group are preferable, and methyl group are more preferable.

In the above structural formula (1), $X^1$ and $X^2$ are the same or different hydrogen atom, halogen atom or the alkyl group having the carbon atoms of 1 to 6.

As said halogen atom, for example fluorine, chlorine, bromine, and iodine or so may be mentioned, and among these, chlorine atom is preferable.

As for the alkyl group having the carbon atoms of 1 to 6, for example methyl group, ethyl group, propyl group, iso-propyl group, butyl group, isobutyl group, sec-butyl group, tert-butyl group, pentyl group or so may be mentioned. Among said alkyl group, for example the alkyl group having the carbon atoms of 1 to 4 such as methyl group, ethyl group, and propyl group or so are preferable. Among the substituent groups described in the above, hydrogen atom or chlorine atom are preferable as $X^1$, and chlorine atom is more preferable. Also, as $X^2$, hydrogen atom or chlorine atom are more preferable, and hydrogen atom is further preferable.

As the specific examples of isothiazoline based compound shown by the above structural formula (1), for example 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 2-ethyl-4-isothiazoline-3-one, 4,5-dichloro-2-cyclohexyl-4-isothiazoline-3-one, 5-chloro-2-ethyl-isothiazoline-3-one, 5-chloro-2-t-octyl-4-isothiazoline-3-one, 5-chloro-2-t-octyl-4-isothiazoline-3-one or so may be mentioned.

Among these, 5-chloro-2-methyl-4-isothiazoline-3-one (hereinafter, it may be referred as "CIT"), 2-methyl-4-isothiazoline-3-one (hereinafter, it may be referred as "MIT"), 2-n-octyl-4-isothiazoline-3-one (hereinafter, it may be referred as "OIT"), 4,5-dichloro-2-n-octyl-4-isothiazoline-3-one are preferable; 5-chloro-2-methyl-4-isothiazoline-3-one or 2-methyl-4-isothiazoline-3-one are more preferable.

The below structural formula (2) shows the example of the benzene ring being formed, among those formed together with the aromatic ring and $X^1$ and $X^2$ of the above mentioned structural formula (1).

[Chemical formula 2]

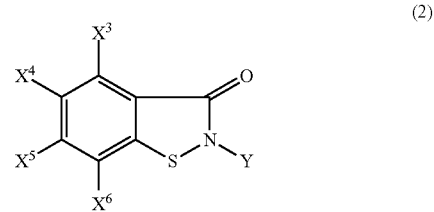

(2)

(In the above formula, Y is the same as the structural formula (1), $X^3$ to $X^6$ are hydrogen atom, halogen atom, hydroxyl group, cyano group, amino group, carboxyl group, alkyl group having the carbon atoms of 1 to 4 or alkoxy group having the carbon atoms of 1 to 4.)

In the above mentioned structural formula (2), $X^3$ to $X^6$ are hydrogen atom, hydroxyl group, halogen atom (for example, chlorine, fluorine, bromine, iodine or so), cyano group, amino group, carboxyl group, alkyl group having the carbon atoms of 1 to 4 (for example, methyl group, ethyl group, propyl group or so), alkoxy group having the carbon atoms of 1 to 4 (for example, methoxy group and ethoxy group or so) or so may be mentioned, however among these, halogen atom or the alkyl group having the carbon atoms of 1 to 4 are preferable. These $X^3$ to $X^6$ may be the same or may be different.

As for isothiazoline based compound shown by the above mentioned structural formula (2), 1,2-benzisothiazoline-3-one (hereinafter, it may be referred as "BIT"), N-methyl-1, 2-benzisothiazoline-3-one or so may be mentioned.

These isothiazoline based compound may be used alone or by combining two or more thereof. Regarding the long term storage stability of the conductive adhesive composition and the battery characteristic (the cycle lifetime) using said conductive adhesive composition, among these, 1,2-benzisothiazoline-3-one are particularly preferably included.

In the present invention, the content of the isothiazoline based compound with respect to the conductive adhesive composition is 0.01 to 1.0 wt %, preferably 0.03 to 0.7 wt %, more preferably 0.05 to 0.5 wt % with respect to 100 wt % of the conductive carbon. If the content of the isothiazoline based compound is less than 0.01 wt %, the growth of the microbes in said conductive adhesive composition is not suppressed, and the long term storage stability of said conductive adhesive composition declines. Also, along with the growth of the microbes in said conductive adhesive composition, the conductive adhesive composition denatures, and the viscosity of the conductive adhesive composition increases. As a result, the handling of the conductive adhesive composition becomes difficult, and the peel strength declines together. On the other hand, if the content of the isothiazoline based compound exceeds 1.0 wt %, an anti-microbial effect can be obtained, however it becomes a resistor at the conductive adhesive layer, hence the output characteristic of the battery declines.

In case the conductive adhesive composition for the electrochemical element electrode includes the dispersant, the used amount of the dispersant may be used within the range which does not compromise the effect of the present invention, thus there is no specific limitation; however usually it is 0.1 to 15 parts by weight, preferably 0.5 to 10 parts by weight, more preferably 0.8 to 5 parts by weight with respect to 100 parts by weight of the conductive carbon.

The solid portion concentration of the conductive adhesive composition for the electrochemical element electrode is usually 10 to 60%, preferably 15 to 50%, and particularly preferably 20 to 40%, although it depends on the method of coating. When the solid portion concentration is within this range, the conductive adhesive layer can be filled highly, and the energy density and the output density of the obtained electrochemical element are increased.

The conductive adhesive composition for the electrochemical element electrode is a slurry form, and the viscosity thereof is usually 10 to 10,000 mPa·s, preferably 50 to 5,000 mPa·s, and particularly preferably 100 to 2,000 mPa·s, although it depends on the method of coating. When the viscosity of the adhesive composition slurry is within this range, the conductive adhesive layer can be formed uniformly on the collector.

The production method of the adhesive composition is not particularly limited, and it may be any means as long as the above mentioned solid portion can be dispersed in the dispersing medium. For example, the dispersion liquid of the particulate copolymer (A), the dispersion liquid of the particulate copolymer (B), the conductive carbon, and arbitrary components added depending on the needs may be mixed all at once, then if needed, the dispersing medium may be added, thereby the solid portion concentration of the dispersion liquid may be controlled. Also, the conductive carbon may be added while being dispersed in the dispersing medium in several parts.

Also, from the point of obtaining the composition slurry having good dispersibility, the particulate polymer (A) and the conductive carbon are contacted, then other components are particularly preferably added. Since the particulate copolymer (A) includes the dibasic acid monomer unit, the affinity with the conductive carbon included in the conductive adhesive is high, thus the dispersibility of the conductive carbon in the composition improves.

(The Collector Having the Adhesive Layer)

The collector having adhesive layer of the present invention can be obtained by coating and drying the conductive adhesive composition for the electrochemical element electrode of above mentioned to the collector for the electrochemical element.

The material of the collector is for example, metal, carbon, conductive polymer or so, and suitably the metal is used. As the metal for the collector, usually aluminum, platinum, nickel, tantalum, titanium, stainless steel, copper and other alloys or so may be used. Among these, from the point of the conductivity and the voltage resistance, copper, aluminum or aluminum alloy are preferably used.

The thickness of the collector is 5 to 100 μm, preferably 10 to 70 μm, and particularly preferably 15 to 50 μm.

The forming method of the conductive adhesive layer is not particularly limited. For example, it is formed on the collector by a doctor blade method, a dip method, a reverse roll method, a direct roll method, a gravure method, an extrusion method, a brushing or so. Alternatively, the conductive adhesive layer may be formed on the releasing paper, then transferred to the collector.

As for the drying method of the conductive adhesive layer, for example the method of drying by warm air, hot air, low humidified air, a vacuum drying, the drying method by irradiating the (far) infrared ray or electron beam or so may be mentioned. Among these, the drying by a hot air, the irradiation of the infrared ray is preferable. The drying temperature and the drying time are preferably those which can completely remove the medium in the slurry coated on the collector; and the drying temperature is 50 to 300° C., preferably 80 to 250° C. The drying time is usually 2 hours or less and preferably 5 seconds to 30 minutes.

The thickness of the conductive adhesive layer is usually 0.5 to 5 μm, preferably 0.8 to 2.5 μm, and particularly preferably 1.0 to 2.0 μm. By having the thickness of the conductive adhesive layer within said range, the electrode composition layer and the collector are well adhered via the adhesive layer, and also the electron transfer resistance can be reduced.

The conductive adhesive layer has the composition corresponding to the solid portion composition of the conductive adhesive composition for the electrochemical element electrode; and it includes the conductive carbon, the particulate copolymer (A) including the dibasic monomer unit, the particulate copolymer (B) including the ethylenic unsaturated carboxylic acid amide derivative monomer.

(The Electrode for the Electrochemical Element)

The electrode for the electrochemical element of the present invention comprises the electrode composition layer on the conductive adhesive layer of the above mentioned collector having the adhesive agent. The electrode composition layer is formed of the electrode active material, the electrode conductive material and the electrode binder, and it is regulated by the slurry including these components.

(The Electrode Active Material)

The electrode active material may be the negative electrode active material, or it may be the positive electrode active material. The electrode active material is the substance which gives and receives the electron in the battery. The volume average particulate diameter of the electrode active material is usually 0.01 to 100 μm, preferably 0.05 to 50 μm, and more preferably 0.1 to 20 μm, for both the positive electrode and the negative electrode. These electrode active materials, respectively, can be used alone or by combining two or more thereof.

(The Electrode Conductive Material)

The electrode conductive material has the conductivity, and formed of carbon allotrope of particulate form which does not have the fine pore capable of forming the electric double layer. Specifically, the conductive carbons such as furnace black, acetylene black, and ketjen black (registered trademark of AkzoNobel Corporate) or so may be mentioned. Among these, the acetylene black and the furnace black are preferable.

(The Electrode Binder)

The electrode binder is not particularly limited, as long as the compound can bind to the electrode active material and the conductive material against each other. The suitable binder is a dispersible binder which has a property to disperse in the medium. As the dispersible binder, for example, the polymer compound such as fluorine polymers, diene polymers, acrylate polymers, polyimides, polyamides, polyurethane polymers or so may be mentioned; and fluorine polymers, diene polymers, or acrylate polymer are preferable. Further, diene polymer or acrylate polymer are more preferable from the point of increasing the voltage resistance, and increasing the energy density of the lithium ion battery.

Diene polymer is a copolymer obtained by polymerizing the homopolymer of the conjugated diene or the monomer mixture including the conjugated diene; or the hydrogenates thereof.

The ratio of the conjugated diene of said monomer mixture is usually 40 wt % or more, preferably 50 wt % or more, and more preferably 60 wt % or more. As the specific example of diene polymers, the conjugated diene homopolymer such as polybutadiene or polyisoprene or so; aromatic vinyl group conjugated diene copolymer such as styrene butadiene copolymer (SBR) which may be carboxy modified; cyanated vinyl conjugated diene copolymer such as acrylonitrile butadiene copolymer (NBR) or so; hydrogenated SBR, hydrogenated NBR or so may be mentioned.

The acrylate polymer is a polymer obtained by polymerizing the monomer mixture including the compound expressed by the general formula (1): $CH_2=CR^1—COOR^2$ (in the formula, $R^1$ is hydrogen atom or methyl group, $R^2$ is alkyl group or cycloalkyl group). As specific examples of the compound expressed by the general formula, acrylates such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, hexyl acrylate, nonyl acrylate, lauryl acrylate, stearyl acrylate or so; methacrylates such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate or so may be mentioned. Among these, acrylates are preferable, and n-butyl acrylate and 2-ethylhexyl acrylate are particularly preferable since the strength of the obtained electrode can be improved. The ratio of the monomer unit derived from acrylates and/or methacrylates in the acrylate polymers is usually 50 wt % or more, and preferably 70 wt % or more. When acrylate polymers having the ratio of monomer unit derived from said acrylates and/or methacrylates within said range are used, the heat resistance is high and the inner resistance of the obtained lithium ion battery electrode can be made small.

Said acrylate polymer can use carboxylic acid containing monomer capable of copolymerizing, besides the compound expressed by said general formula (1); as a specific example, a monobasic acid containing monomer such as acrylic acid, methacrylic acid or so; a dibasic acid containing monomer such as maleic acid, fumaric acid, itaconic acid or so may be mentioned. Among these, dibasic acid containing monomer is preferable, and the itaconic acid is particularly preferable from the point of increasing the binding property between the conductive adhesive layer, and improving the electrode strength. These monobasic acid containing monomer and the dibasic acid containing monomer may be used alone or by combing two or more thereof. When copolymerizing, the amount of the carboxylic acid containing monomer of said monomer mixture is usually 0.1 to 50 parts by weight, preferably 0.5 to 20 parts by weight, more preferably 1 to 10 parts by weight, with respect to 100 parts by weight of compound expressed by the general formula (1). When the content of the carboxylic acid containing monomer is within this range, the binding property between the conductive adhesive layer is excellent and the obtained electrode strength is enhanced.

Said acrylate polymer can use nitrile containing monomer capable of copolymerizing, besides the compound expressed by the general formula (1). As the specific example of nitrile containing monomer, acrylonitrile or methacrylonitrile or so may be mentioned; and acrylonitrile is preferable from the point of increasing the binding property between the conductive adhesive layer and improving the electrode strength. When copolymerizing, the amount of the acrylonitrile in said monomer mixture is usually 0.1 to 40 parts by weight, preferably 0.5 to 30 parts by weight, more preferably 1 to 20 parts by weight with respect to 100 parts by weight of the compound expressed by the general formula (1). When the amount of the acrylonitrile is within this range, the binding property with the conductive adhesive layer is excellent and the obtained electrode strength is enhanced.

The shape of the electrode binder is not particularly limited, however the particulate form is preferable since the binding property between the conductive adhesive layer is good, and the decline of the electrode capacity and the deterioration caused by the repeating charge and discharge can be suppressed.

The glass transition temperature (Tg) of the electrode binder is preferably 50° C. or less, further preferably −40 to 0° C. When the glass transition temperature (Tg) of the binder is within this range, the binding property is excellent even if the small amount is used, and the electrode strength is strong, while having flexibility, and easily enhancing the electrode density by the press step during the electrode forming.

In case the electrode binder is a particulate form, the number average particle diameter is not particularly limited, however usually it is 0.0001 to 100 μm, preferably 0.001 to 10 μm, and more preferably 0.01 to 1 μm. When the number average particle diameter is within this range, an excellent binding force can be provided to the electrode even with a small amount. Here, the number average particle diameter is a value obtained by measuring the diameter of 100 binder particles which are arbitrary selected using the transmission electron microscope, then calculating the arithmetic average value thereof. The shape of the particle may be either of a spherical shape, a heteromorphic shape or so. These binders may be used alone or by combining two or more thereof.

The amount of the electrode binder is usually 0.1 to 50 parts by weight, preferably 0.5 to 20 parts by weight, and more preferably 1 to 10 parts by weight, with respect to 100 parts by weight of the electrode active material. When the electrode binder is within this range, a sufficient adhesiveness between the obtained electrode composition layer and the conductive adhesive layer can be ensured, and the capacity of the lithium ion battery can be made higher, and the inner resistance thereof can be made low.

(The Electrode Composition Layer)

The electrode composition layer is provided on the conductive adhesive layer, however the method of forming is not particularly limited. The electrode forming composition can blend the electrode active material, the conductive material, the binder as the essential component, and other dispersant and additives if needed. As specific example of the dispersant, cellulose based polymer such as carboxymethyl cellulose, methyl cellulose, ethyl cellulose, and hydroxypropyl cellulose and the ammonium salt and the alkali metal salt thereof; poly(meth)acrylic acid salt such as sodium poly(meth)acrylate; polyvinyl alcohol, modified polyvinyl alcohol, polyethylene oxide, polyvinyl pyrrolidone, polycarboxylic acid, oxidized starch, phosphate starch, casein, various modified starch or so may be mentioned. These dispersants can be used alone or by combining two or more thereof. Among these, cellulose based polymer is preferable, and carboxymethyl cellulose, or the ammonium salt or the alkali salt thereof are particularly preferable. The amount of these dispersant is not particularly limited, however usually it is 0.1 to 10 parts by weight, preferably 0.5 to 5 parts by weight, and more preferably 0.8 to 2 parts by weight, with respect to 100 parts by weight of the electrode active material.

In case of forming the electrode composition layer, the electrode forming composition having a paste form (hereinafter, it may be referred as "electrode composition layer slurry") can be produced by kneading the electrode active material, the conductive material, and the binder which are the essential component, and also other dispersants and the additives in the water or the organic solvent such as N-methyl-2-pyrrolidone or tetrahydrofuran or so.

The solvent used for obtaining the slurry is not particularly limited, however in case the above mentioned dispersant is used, the solvent capable of dissolving the dispersant is suitably used. Specifically, usually the water is used, however the organic solvent can be used, and the mixed solvent of the water and the organic solvent may be used. As for the organic solvent, for example, alkyl alcohols such as methyl alcohol, ethyl alcohol, propyl alcohol or so; alkyl ketones such as acetone, methylethyl ketone or so; ethers such as tetrahydrofuran, dioxiane, diglyme or so; amides such as diethylformamide, dimethylacetoamide, N-methyl-2-pyrrolidone, dimethyl immidazolinedinone or so; iodine based solvent such as dimethylsulfoxide, sulfolane or so may be mentioned. Among these organic solvents, alcohols are preferable. The electrode composition layer slurry is preferably water-based slurry which uses the water as the dispersing medium since it is excellent from the point of the environmental load and easiness to dry the electrode composition layer. If the water and the organic solvent having lower boiling point than the water is used together, when spray drying, the drying speed can be faster. Also, depending on the amount and the type of the organic solvent used together with water, the dispersibility of the binder and the solubility of the dispersant changes. Thereby, the viscosity or the fluidity of the slurry can be controlled, and the productivity can be improved.

As the amount of the solvent used for preparing the slurry, the solid portion concentration of the slurry is usually 1 to 90 wt %, preferably 5 to 85 wt %, and more preferably 10 to 80 wt %. When the solid portion concentration is within this range, each component is uniformly dispersed, hence it is suitable.

The method and the step of dispersing or dissolving the electrode active material, the conductive material, the binder, other dispersants or the additives to the solvent is not particularly limited, and for example the method of adding and mixing the electrode active material, the conductive material, the binder, other dispersant or the additives to the solvent; the method of dissolving the dispersant in the solvent, then adding and mixing the binder dispersed in the solvent, and finally adding and mixing the electrode active material and the conductive material; the method of adding and mixing the electrode active material and the conductive material to the binder dispersed in the solvent, then adding and mixing the dispersant in which this mixture is dissolved in the solvent or so may be mentioned. As for the mixing means, for example the mixing apparatus such as a ball mill, a sand mill, a beads mill, a pigment disperser, a grinder, an ultrasonic disperser, a homogenizer, a homomixer, a planetary mixer or so may be mentioned. The mixing is usually carried out at a room temperature to 80° C., for 10 to several hours.

The viscosity of the slurry is usually 10 to 100,000 mPa·s, preferably 30 to 50,000 mPa·s, and more preferably 50 to 20,000 mPa·s at a room temperature. When the viscosity of the slurry is within this range, the productivity can be increased.

The coating method to the conductive adhesive layer of the slurry is not particularly limited. For example, the method such as a doctor blade method, a dip method, a reverse roll method, a direct roll method, a gravure method, an extrusion method, a brush method or so may be mentioned. The coating thickness of the slurry is suitably set depending on the thickness of the electrode composition layer of the object.

As the drying method, for example the drying using a warm air, a hot air, a low humidified air, a vacuum drying; the drying method by the irradiation of the (far) infrared ray or the electron beam or so may be mentioned. Among these, the drying method by the irradiation of the far infrared ray is preferable. The drying temperature and the drying time are preferably those which can completely remove the solvent in the slurry which were coated on the collector. As for the drying temperature, it is 100 to 300° C., and preferably 120 to 250° C. As for the drying time, it is usually 10 minutes to 100 hours, preferably 20 minutes to 20 hours.

The density of the electrode composition layer is not particularly limited, however usually it is 0.30 to 10 g/cm$^3$, preferably 0.35 to 8.0 g/cm$^3$, more preferably 0.40 to 6.0 g/cm$^3$. Also, the thickness of the electrode composition layer is not particularly limited, however usually it is 5 to 100 μm, preferably 20 to 500 μm, and more preferably 30 to 300 μm.

(The Electrochemical Element)

As for the used embodiment of said electrochemical element electrode, lithium ion secondary battery using said electrode, an electric double layer capacitor, a lithium ion capacitor, a sodium battery, a magnesium battery or so may be mentioned, and the lithium ion secondary battery is suitable. For example, the lithium ion secondary battery is constituted by said electrochemical element electrode, the separator, and the electrolytic solution.

(The Separator)

The separator can insulate between the electrochemical element electrodes, and it is not particularly limited as long as cation and anion can pass through. Specifically, (a) the porous separator having pores, (b) the porous separator formed with polymer coat layer on one side or both sides, or (c) the porous separator formed with the porous resin coat layer including the inorganic ceramic powder or so may be mentioned. As the non-limiting example of these, the porous separator of polypropylene based, polyethylene based, polyolefin based, or alamid based; the separator coated with the gelated polymer coat layer, the polymer film for solid polymer electrolyte or gelated polymer electrolytes such as polyvinylidene fluoride, polyethylene oxide, polyacrylonitrile or polyvinylidenefluoropropylene copolymer or so; or the separator coated with the porous membrane layer consisting of inorganic filler or the dispersant for the inorganic filler or so can be used. The separator is placed between the electrochemical element electrodes so that a pair of said electrode composition layer opposes; thereby the element is obtained. The thickness of the separator is selected accordingly depending on the object of use, and usually it is 1 to 100 μm, preferably 10 to 80 μm, and more preferably 20 to 60 μm.

(The Electrolytic Solution)

The electrolytic solution used is not particularly limited; and for example, a solution obtained by dissolving a lithium salt as a supporting electrolyte in a non-aqueous solvent may be used. As the lithium salt, for example $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2Nli$ or so, and $(C_2F_5SO_2)NLi$ or so may be mentioned. $LiPF_6$, $LiClO_4$, and $CF_3SO_3Li$, are suitably used since it easily dissolves and show high dissociation degree. These can be used alone or by combining two or more thereof. The amount of the supporting electrolyte is usually 1 wt % or more and preferably 5 wt % or more, and usually 30 wt % or less and preferably 20 wt % or less, with respect to the electrolytic solution. If the amount of the supporting electrolyte is too little or too much, ionic conductivity deteriorates, and the charging property and discharging property of the battery deteriorate.

The solvent used in the electrolytic solution is not particularly limited, as long as it dissolves the supporting electrolyte. However, usually alkyl carbonates such as dimethyl carbonate (DMC), ethylene carbonate (EC), diethyl carbonate (DEC), propylene carbonate (PC), butylene carbonate (BC), and methylethyl carbonate (MEC) or so; esters such as γ-butyrolactone and methyl formate or so; ethers such as 1,2-dimethoxyethane and tetrahydrofuran or so; and sulfur containing compounds such sulfolane and dimethylsulfoxide or so are used. Dimethyl carbonate, ethylene carbonate, propylene carbonate, diethyl carbonate, and methylethyl carbonate are particularly preferable since these can easily attain high ion conductivity, and has wide range of used temperature. These can be used alone or by combining two or more thereof. Also, the electrolytic solution can be used by comprising the additives. As the additives, compound of carbonates such as vinylene carbonate (VC) or so is preferable.

As the electrolytic solution other than the above mentioned, gel polymer electrolytes obtained by impregnating an electrolytic solution in a polymer electrolyte such as polyethylene oxide and polyacrylonitrile or so, and inorganic solid electrolytes such as lithium sulfide, LiI and $Li_3N$ or so, may be mentioned.

The negative electrode and the positive electrode may be stacked via the separator disposed therebetween, and this may be wound, folded or so depending on the shape of the battery, and then placed in a battery case, followed by injecting the electrolytic solution into the battery case and seal; thereby the secondary battery is obtained. Further, if necessary, expanded metal, an overcurrent prevention element such as a fuse and a PTC element, a lead plate or so may also be placed into prevent an increase of the internal pressure in the battery, and to prevent overcharge/discharge. The shape of the battery may be any of a laminate cell type, coin type, button type, sheet type, cylinder type, horn shape, and flat type.

EXAMPLES

Hereinafter, the present invention will be described based on the examples, however the present invention is not be limited thereto. Note that, parts and % in the present examples are based on the weight unless mentioned otherwise. In the examples and the comparative examples, various physical properties are evaluated as following.

(The Appearance of the Conductive Adhesive Layer)

The appearance of the conductive adhesive layer surface formed on the aluminum collector was evaluated by visual observation. If there was no defect on the conductive adhesive layer surface, it was evaluated as A; if a pinhole or a crater having a diameter of 1 μm or less was observed, it was evaluated as B; and if a crater having the diameter of 1 μm or larger or a crack was observed, it was evaluated as C.

(The Battery Characteristic and the Durability of the Lithium Ion Secondary Battery)

A coin shape lithium ion secondary battery was produced using the lithium ion secondary battery electrode produced in the examples and the comparative examples. As the battery characteristic of this lithium ion secondary battery, the capacity and the inner resistance were measured by carrying out the charge-discharge procedures after leaving for 24 hours. Here, the charge was started by constant electrical current, and when the voltage reaches to 4.0 V, this voltage was maintained for an hour; thereby the constant voltage charge was carried out. Also, the discharge was carried out until it reaches to 2.0 V by the constant electrical current immediately after completing the charge.

The capacity was calculated as the capacity per unit weight of the electrical active material from the energy amount during the discharge.

(The Cycle Lifetime)

For the cycle lifetime, the lithium ion secondary battery was carried out with the charge-discharge cycle in the thermostat chamber at 70° C., and the capacity maintaining rate after the $100^{th}$ cycle with respect to the initial capacity was calculated, then the evaluation was carried out based on the following standard. The larger the capacity maintaining rate is, the more excellent the durability is.

SA: The capacity maintaining rate is 93% or higher.
A: The capacity maintaining rate is 90% or higher and less than 93%.
B: The capacity maintaining rate is 80% or higher and less than 90%.
C: The capacity maintaining rate is less than 80%.

(The Peel Strength of the Electrode)

The lithium ion secondary battery was cut out into a parallelepiped shape having the length of 100 mm and the width of 10 mm so that the coating direction of the electrode composition layer is a long side; thereby the specimen was made. The cellophane tape (those defined by JIS Z1522) was adhered on the electrode composition layer surface by facing the electrode composition layer of the specimen down, then one end of the collector was stretched in a vertical direction at the stretching speed of 50 mm/min, and the stress when the tape was peeled was measured (note that, the cellophane tape is fixed to the test board). This measurement was carried out for three times, and the average value thereof was obtained to determine the peel strength, and evaluated based on the following standard. The larger the peel strength is, the larger the binding force to the collector of the electrode composition layer is, which indicates that the electrode strength is large.
A: The peel strength is 20 N/m or more.
B: The peel strength is 10 N/m or more and less than 20 N/m.
C: The peel strength is less than 10 N/m.
(The Long Term Storage Test)

For the long term storage test, the lithium ion secondary battery was charged until 4.2 V, and stored for 30 days in the thermostat chamber at 45° C., then the capacity maintaining rate (the maintained capacity/the initial capacity) was calculated from the maintained capacity and the initial capacity, and the evaluation was carried out based on the following standard. The larger the capacity maintaining rate, the more excellent the long term storage characteristic is.
A: The capacity maintaining rate is 90% or more.
B: The capacity maintaining rate is 70% or more and less than 90%.
C: The capacity maintaining rate is less than 70%.
(The Volume Average Particle Diameter of the Particulate Copolymer)

The volume average particle diameter was measured using the particle size analyzer (Coulter LS230: made by Beckman Coulter, Inc).
(The Production of the Binder)
<The Production of the Particulate Copolymer (A1)>

To the pressure resistance reaction device with the disperser, 3 parts in solid portion of the seed latex (the latex of polymer particle having the particle diameter of 70 nm obtained by polymerizing 38 parts of styrene, 60 parts of methylmethacrylate and 2 parts of methacrylic acid), butyl acrylate: 10 parts, 2-ethylhexylacrylate: 56 parts, 1 part: itaconic acid, styrene: 6 parts, ammonium lauryl sulfate (anionic surfactant): 2 parts, and ion exchange water: 108 parts were added, and dispersed. Next, the temperature inside the reaction device was raised to 60° C., and 4% potassium persulfate solution was introduced to initiate the polymerization reaction. Then, the polymerization reaction was preceded, and when the polymerization conversion rate reached to 70%, the reaction temperature was raised to 70° C. While maintaining the reaction temperature at 70° C., the polymerization reaction was continued until the polymerization conversion rate reached 97%. The polymerization reaction was terminated by cooling the reaction system to room temperature, and by reducing the pressure, the non-reacted monomers were removed. The ion exchange water was added, and the solid portion concentration was regulated to 45%, and the dispersion liquid was regulated to pH of 7.5, thereby the dispersion liquid of the particulate copolymer (A1) was obtained. Note that, the regulation of the dispersion liquid pH was done by adding 10% ammonium aqueous solution. The volume average particle diameter of the obtained particulate copolymer (A1) was 320 nm, and THF insoluble part was 88%.
<The Production of the Particulate Copolymer (A2)>

To the stainless pressure resistance reaction device with the disperser, 3 parts of seed latex in solid portion, styrene: 6 parts, 2-ethylhexylacrylate: 60 parts, acrylic acid: 1 part, itaconic acid: 3 parts, ammonium lauryl sulfate: 2 parts, and ion exchange water: 108 parts were added, and dispersed. Next, the temperature inside the reaction device was raised to 60° C., and 4% potassium persulfate solution was introduced to initiate the polymerization reaction. Then, the polymerization reaction was preceded, and when the polymerization conversion rate reached to 70%, the reaction temperature was raised to 70° C. While maintaining the reaction temperature at 70° C., the polymerization reaction was continued until the polymerization conversion rate reached 97%. The polymerization reaction was terminated by cooling the reaction system to room temperature, the non-reacted monomer was removed. The solid portion concentration was regulated to 45%, and the dispersion liquid was regulated to pH of 7.5, thereby the dispersion liquid of the particulate copolymer (A2) was obtained. Note that, the regulation of the dispersion liquid pH was done by adding 10% ammonium aqueous solution. The volume average particle diameter of the obtained particulate copolymer (A2) was 380 nm, and THF insoluble part was 81%.
<The Production of the Particulate Copolymer (A3)>

To the 5 MPa pressure resistance device with the disperser, 60 parts of styrene, 37 parts of 1,3-butadiene, 3 parts of itaconic acid, 5 parts of sodium dodecyl benzene sulfonate, 150 parts of ion exchange water, and 1 part of potassium persulfate as the polymerization initiator were introduced, and thoroughly dispersed, then it was heated to 50° C. to initiate the polymerization. When the polymerization conversion rate reached to 65%, the reaction temperature was raised to 70° C.

The reaction was terminated by cooling when the monomer consumption rate reached to 95.0%, and the diene based polymer aqueous dispersion liquid having the solid portion concentration of 40% was regulated to pH of 7.5, thereby the particulate copolymer (A3) was obtained. Note that, the regulation of the pH of the dispersion liquid was done by adding 10% ammonium aqueous solution. The volume average particle diameter of the obtained particulate copolymer (A3) was 310 nm, and THF insoluble part was 86%.
<The Production of the Particulate Copolymer (B1)>

To the stainless pressure resistance reaction device with the disperser, 3 parts of seed latex in solid portion, styrene: 40 parts, butyl acrylate: 50 parts, N-methylol acrylamide: 2 parts, acrylic acid: 1 part, methacrylic acid: 1 part, ammonium lauryl sulfate: 3 parts, and ion exchange water 108 parts were added and dispersed. Next, the temperature inside the reaction device was raised to 60° C., and 4% potassium persulfate solution was introduced to initiate the polymerization reaction. Then, the polymerization reaction was preceded, and when the polymerization conversion rate reached to 70%, the reaction temperature was raised to 70° C. While maintaining the reaction temperature at 70° C., the polymerization reaction was continued until the polymerization conversion rate reached 95%. The polymerization reaction was terminated by cooling the reaction system to room temperature, the non-reacted monomer was removed. The solid portion concentration was regulated to 45%, and the dispersion liquid was regulated to pH of 7.5, thereby the dispersion liquid of the particulate copolymer (A1) was obtained. Note that, the regulation of pH of the dispersion liquid was done by adding 10% ammonium aqueous solution. The volume average particle diameter of the obtained particulate copolymer (B1) was 180 nm, and THF insoluble part was 18%.
<The Production of the Particulate Copolymer (B2)>

To the stainless pressure resistance reaction device with disperser, 3 parts of seed latex in solid portion, acrylonitrile: 30 parts, styrene: 6 parts, 2-ethylhexyl acrylate: 30 parts, acrylic acid: 1 part, methacrylic acid: 1 part, acryl amide: 2 parts, ammonium lauryl sulfate: 2.5 parts, and ion exchange water: 108 parts were added, and dispersed. Next, the temperature inside the reaction device was raised to 60° C., and 4% potassium persulfate solution was introduced to initiate the polymerization reaction. Then, the polymerization reaction was preceded, and when the polymerization conversion rate reached 70%, the reaction temperature was raised to 70° C. While maintaining the reaction temperature at 70° C., the polymerization reaction was continued until the polymerization conversion rate reached 95%. Then, the polymerization reaction was terminated by cooling the reaction system to room temperature, and the non-reacted monomer was removed. The solid portion concentration was regulated to 45%, and the dispersion liquid was regulated to pH of 7.5, thereby the dispersion liquid of the particulate copolymer (B2) was obtained. Note that, the regulation of the dispersion liquid pH was done by adding 10% ammonium aqueous solution. The volume average particle diameter of the obtained particulate copolymer (B2) was 120 nm, and THF insoluble part was 22%.

<The Production of the Particulate Copolymer (C)>

To the stainless pressure resistance reaction device with the disperser, 3 parts of seed latex in solid portion, acrylonitrile: 10 parts, styrene: 6 parts, butyl acrylate: 10 parts, 2-ethylhexylacrylate: 60 parts, itaconic acid: 2 parts, acrylic acid: 1 part, methacrylic acid: 1 part, N-methylol acrylamide: 2 parts, ammonium lauryl sulfate: 2 parts, and ion exchange water: 108 parts were added and dispersed. Next, the temperature inside the reaction device was raised to 60° C., and 4% potassium persulfate solution was introduced to initiate the polymerization reaction. Then, the polymerization reaction was preceded, and when the polymerization conversion rate reached to 70%, the reaction temperature was raised to 70° C. While maintaining the reaction temperature at 70° C., the polymerization reaction was continued until the polymerization conversion rate reached 93%. The polymerization reaction was terminated by cooling the reaction system to room temperature, the non-reacted monomer was removed. The solid portion concentration was regulated to 45%, and the dispersion liquid was regulated to pH of 7.5, thereby the dispersion liquid of the particulate copolymer (C) was obtained. Note that, the regulation of pH of the dispersion liquid was done by adding 10% ammonium aqueous solution. The volume average particle diameter of the obtained particulate copolymer (C) was 200 nm, and THF insoluble part was 58%.

<The Production Method of the Particulate Copolymer (D)>

To the stainless pressure resistance reaction device with the disperser, 3 parts of seed latex in solid portion, styrene: 27 parts, butyl acrylate: 70 parts, ammonium lauryl sulfate: 2 parts, and ion exchange water: 108 parts were added and dispersed. Next, the temperature inside the reaction device was raised to 60° C., and 4% potassium persulfate solution was introduced to initiate the polymerization reaction. Then, the polymerization reaction was preceded, and when the polymerization conversion rate reached to 70%, the reaction temperature was raised to 70° C. While maintaining the reaction temperature at 70° C., the polymerization reaction was continued until the polymerization conversion rate reached 93%. The polymerization reaction was terminated by cooling the reaction system to room temperature, and the non-reacted monomer was removed. The solid portion concentration was regulated to 45%, and the dispersion liquid was regulated to pH of 7.5, thereby the dispersion liquid of the particulate copolymer (D) was obtained. Note that, the regulation of pH of the dispersion liquid was done by adding 10% ammonium aqueous solution. The volume average particle diameter of the obtained particulate copolymer (D) was 180 nm, and THF insoluble part was 62%.

Examples 1 to 5 and Comparative Examples 2 to 6

(The Production of the Conductive Adhesive Composition)

The carbon material (DENKA BLACK) were added to the aqueous solution in which the dispersant (polyvinyl alcohol) was dissolved in the ion exchange water, then it was dispersed for 60 minutes by high speed rotation using the beads mill. Then, the dispersion liquid of the particulate copolymer were added and dispersed for 5 minutes by low speed rotation, thereby the conductive adhesive composition was produced so that the solid portion ratio becomes as described in Table 1. (The solid portion concentration is 18 to 20%)

(The Forming of the Conductive Adhesive Layer)

Said conductive adhesive agent was coated on the aluminum collector by the roll bar using the cast method, and it was coated on both the front and the back surface of the collector at the casting speed of 20 m/min, then dried for 1 minute at 60° C., followed by 2 minutes at 120° C., thereby the conductive adhesive layer having the thickness of 1.2 μm was formed.

(The Production of the Electrode)

As the electrode active material of the positive electrode, 100 parts of lithium cobalate having the volume average particle diameter of 8 μm, 2.0 parts in terms of solid portion of 1.5% aqueous solution of carboxymethylcellulose ammonium as the dispersant (DN-800HI made by Daicel Corporation), 5 parts of acetylene black as the conductive material (DENKA BLACK powder: DENKI KAGAKU KOGYO KABUSHIKI KAISHA), 3.0 parts in terms of solid portion of 40% aqueous dispersion of the acrylic polymer having the number average particle diameter of 0.25 μm and the glass transition temperature of −28° C. as the electrode composition binder, and the ion exchange water were mixed by the planetary mixer so that the entire solid portion concentration becomes 35%, thereby the electrode composition of the positive electrode was prepared.

Said positive electrode composition was coated on both the front and the back surface of the aluminum collector formed with said conductive adhesive layer at the electrode casting speed of 20 m/min, and dried for 5 minutes at 120° C., then punched out in 5 cm square, thereby the lithium ion secondary battery of the positive electrode having the electrode composition layer with 100 nm of the thickness of the one side was obtained.

On the other hand, as the active material of the negative electrode, 100 parts of graphite (KS-6: made by TIMCAL Graphite & Carbon) having the volume average particle diameter of 3.7 μm, 2.0 parts in terms of solid portion of 1.5% aqueous solution of carboxymethylcellulose ammonium as the dispersant (DN-800H: made by Daicel Corporation), 5 parts of acetylene black as the conductive material (DENKA BLACK powder: DENKI KAGAKU KOGYO KABUSHIKI KAISHA), 3.0 parts in terms of solid portion of 40% aqueous dispersion of the diene polymer having the number average particle diameter of 0.18 nm and the glass transition temperature of −48° C. as the electrode composition binder, and the ion exchange water were mixed by the planetary mixer so that the entire solid portion concentration becomes 35%, thereby the electrode composition of the negative electrode was prepared.

The above mentioned negative electrode slurry composition was coated on one side of the copper foil having the thickness of 18 μm using the comma coater so that the thickness after the drying was 100 μm, then it was dried for 20 minutes at 60° C. and heat treated for 20 minutes at 150° C., thereby the negative electrode active material layer was formed. Then, the negative electrode plate having the thickness of 50 μm was obtained by pressure stretching by the roll press.

(The Production of the Battery)

Using said positive electrode, said negative electrode, and the separator, the lithium ion battery of multilayered laminate cell form was produced. As for the electrolytic solution, those dissolving $LiPF_6$ in the concentration of 1.0 mol/l in the mixed solvent of ethylene carbonate and diethylcarbonate in a weight ratio of 1:2 was used.

Examples 6 to 9

In the examples 6 to 9, the lithium ion secondary battery electrode and lithium ion secondary battery were produced as same as the example 1, except that the conductive adhesive composition was prepared so that the solid portion ratio becomes as described in Table 1, by adding the aqueous solution of the isothiazoline into the solution dispersed with the dispersant, carbon material and the particulate copolymer. The measured results of each characteristic of this lithium ion battery are shown in Table 1.

Note that, the aqueous solution of isothiazoline used in the examples 6, 8 and 9 was ACTICIDE (Registered Trade Mark) MBS made by SO JAPAN (5% aqueous solution of 2-methyl-4-isothiazoline-3-one (MIT)/1,2-benz-4-isothiazoline-3-one (BIT)=50/50).

Also, the aqueous solution of isothiazoline used in the example 7 was ACTICIDE (Registered Trade Mark) 5008 (5% aqueous solution of 5-chloro-2-methyl-4-isothiazoline-3-one (CIT)/2-methyl-4-isothiazoline-3-one (MIT)=50/50), instead of ACTICIDE (Registered Trade Mark) MBS.

The Comparative Example 1

The lithium ion battery electrode and the lithium ion battery were produced as same as the example 1 except that the aluminum collector having a thickness of 30 nm without the conductive adhesive layer as the collector for the positive electrode. The measured results of each characteristic of this lithium ion battery are shown in Table 1.

a tetrahydrofuran insoluble part of the particulate copolymer (B) is 0 to 25 wt %.

2. The conductive adhesive composition for the electrochemical element electrode as set forth in claim 1, wherein said particulate copolymer (A) is;
a particulate copolymer (A-I) obtained by an emulsion polymerization of a monomer mixture including 60 to 90 wt % of ethylenic unsaturated carboxylic acid ester, 0.1 to 5 wt % of dibasic acid monomer, and 39.9 to 5 wt % of monoolefinic monomer copolymerizable therewith; and/or,
a particulate copolymer (A-II) obtained by emulsion polymerization of a monomer mixture including 20 to 50 wt % of diene based monomer, 0.1 to 5 wt % of dibasic acid monomer, and 79.9 to 50 wt % of monoolefinic monomer copolymerizable therewith.

3. The conductive adhesive composition for the electrochemical element electrode as set forth in claim 1, wherein said particulate copolymer (B) is a particulate copolymer obtained by an emulsion polymerization of a monomer mixture including 1 to 5 wt % of ethylenic unsaturated carboxylic acid monomer, 0.1 to 3 wt % of ethylenic unsaturated carboxylic acid amide derivative, and 35 to 90 wt % of monoolefinic monomer copolymerizable therewith.

4. The conductive adhesive composition for the electrochemical element electrode as set forth in claim 1, wherein a content ratio of the conductive carbon is 8 to 38 wt %, the content ratio of the particulate copolymer (A) is 1 to 4 wt %, the content ratio of the particulate copolymer (B) is 0.1 to 1 wt %, and the content ratio of the dispersing medium is 60 to 90 wt %.

TABLE 1

| Blending (parts by weight) | | Examples | | | | | | | | | Comparative Examples | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| A-I | A1 | 10 | | 15 | 8 | 5 | 10 | 10 | | 5 | | | | | | |
| | A2 | | 10 | | | 5 | | | | | | | 13 | | | |
| A-II | A3 | | | | | | | | 10 | 5 | | | | | | 13 |
| B1 | | 3 | 3 | 2 | | 3 | 3 | 3 | 3 | 3 | | | | 15 | | |
| B2 | | | | | 5 | | | | | | | | | | | |
| C | | | | | | | | | | | | | | | 13 | |
| D | | | | | | | | | | | | | | | | 13 |
| Carbon | | 100 | 100 | 100 | 100 | 100 | 100 | 100 | 100 | 100 | — | 100 | 100 | 100 | 100 | 100 |
| Dispersant | | 5 | 5 | 5 | 5 | 5 | 5 | 5 | 5 | 5 | — | 1 | 5 | 10 | 1 | 1 |
| Antioxidant | | — | — | — | — | — | 0.3 (BIT/MIT) | 0.3 (BIT/CIT) | 0.3 (BIT/MIT) | 0.3 (BIT/MIT) | — | — | — | — | — | — |
| Appearance | | A | A | A | A | A | A | A | A | A | — | C | A | A | C | C |
| Cycle lifetime (capacity maintaining rate) | | A | A | A | A | A | SA | SA | SA | SA | B | — | B | C | C | C |
| Peel strength | | A | A | A | B | A | A | A | A | A | B | — | C | B | C | C |
| Long term storage characteristic | | B | B | B | B | B | A | A | A | A | C | C | C | C | C | C |

For the comparative example 2, the evaluations of the cycle lifetime and the peel strength were omitted due to the obcious defect of the appearance.

The invention claimed is:

1. A conductive adhesive composition for electrochemical element electrode comprising a conductive carbon, a particulate copolymer (A) including dibasic acid monomer unit, a particulate copolymer (B) including ethylenic unsaturated carboxylic acid amide derivative unit, and a dispersing medium,
wherein the volume average particle diameter of the particulate copolymer (A) is 300 to 500 nm,
the volume average particle diameter of the particulate copolymer (B) is 80 to 200 nm, and 5. The conductive adhesive composition for the electrochemical element electrode as set forth in claim 1 comprising 0.01 to 1.0 wt % of isothiazoline based compound with respect to the conductive carbon.

6. A collector with an adhesive layer comprising a conductive adhesive layer obtained by coating and drying the conductive adhesive composition for the electrochemical element electrode as set forth in claim 1 on a collector.

7. A collector having an adhesive layer comprising a conductive adhesive layer comprising a conductive carbon, a particulate copolymer (A) including dibasic acid monomer unit, and a particulate copolymer (B) including ethylenic unsaturated carboxylic acid amide derivative monomer unit on the collector.

8. The collector having the adhesive layer as set forth in claim 6 wherein a thickness of said conductive adhesive layer is 0.5 to 5 μm.

9. An electrochemical element electrode comprising an electrode composition layer including an electrode active material on the conductive adhesive layer of the collector having the adhesive layer as set forth in claim 6.

10. The conductive adhesive composition for the electrochemical element electrode as set forth in claim 2, wherein said particulate copolymer (B) is a particulate copolymer obtained by an emulsion polymerization of a monomer mixture including 1 to 5 wt % of ethylenic unsaturated carboxylic acid monomer, 0.1 to 3 wt % of ethylenic unsaturated carboxylic acid amide derivative, and 35 to 90 wt % of monoolefinic monomer copolymerizable therewith.

11. The conductive adhesive composition for the electrochemical element electrode as set forth in claim 2, wherein a content ratio of the conductive carbon is 8 to 38 wt %, the content ratio of the particulate copolymer (A) is 1 to 4 wt %, the content ratio of the particulate copolymer (B) is 0.1 to 1 wt %, and the content ratio of the dispersing medium is 60 to 90 wt %.

12. The conductive adhesive composition for the electrochemical element electrode as set forth in claim 3, wherein a content ratio of the conductive carbon is 8 to 38 wt %, the content ratio of the particulate copolymer (A) is 1 to 4 wt %, the content ratio of the particulate copolymer (B) is 0.1 to 1 wt %, and the content ratio of the dispersing medium is 60 to 90 wt %.

13. The conductive adhesive composition for the electrochemical element electrode as set forth in claim 2 comprising 0.01 to 1.0 wt % of isothiazoline based compound with respect to the conductive carbon.

14. The conductive adhesive composition for the electrochemical element electrode as set forth in claim 3 comprising 0.01 to 1.0 wt % of isothiazoline based compound with respect to the conductive carbon.

15. The conductive adhesive composition for the electrochemical element electrode as set forth in claim 4 comprising 0.01 to 1.0 wt % of isothiazoline based compound with respect to the conductive carbon.

16. The conductive adhesive composition for electrochemical element electrode as set forth in claim 1, wherein a tetrahydrofuran insoluble part of the particulate copolymer (A) is 60 to 99 wt %.

17. The conductive adhesive composition for electrochemical element electrode as set forth in claim 1, wherein the particulate copolymer (A) does not comprise an ethylenic unsaturated carboxylic acid amide derivative unit, and the particular copolymer (B) does not comprise a dibasic acid monomer unit.

18. The collector having an adhesive layer comprising a conductive adhesive layer as set forth in claim 7, wherein the particulate copolymer (A) does not comprise an ethylenic unsaturated carboxylic acid amide derivative unit, and the particular copolymer (B) does not comprise a dibasic acid monomer unit.

* * * * *